United States Patent [19]

Szabo

[11] 4,440,439
[45] Apr. 3, 1984

[54] CONVERTIBLE SEATS FOR TRANSPORT

[76] Inventor: George S. A. Szabo, Gleimstrasse 2, 8000 München 80, Fed. Rep. of Germany

[21] Appl. No.: 352,772

[22] Filed: Feb. 26, 1982

Related U.S. Application Data

[63] Continuation of Ser. No. 102,236, Dec. 10, 1979.

[30] Foreign Application Priority Data

Dec. 14, 1978 [GB] United Kingdom ............... 48472/78

[51] Int. Cl.³ ............................................. A47C 13/00
[52] U.S. Cl. ........................................ 297/62; 5/9 B; 297/243
[58] Field of Search ................. 297/62, 111, 112, 118, 297/243; 5/8, 9 R, 9 B; 244/188.6; 105/316, 317, 322, 315

[56] References Cited

U.S. PATENT DOCUMENTS

| 22,782 | 2/1859 | Child | 297/62 |
|---|---|---|---|
| 475,791 | 5/1892 | Morrison | 297/62 |
| 2,608,366 | 8/1952 | Jergenson | 297/62 X |
| 2,775,996 | 1/1957 | Millar | 297/62 |
| 2,966,199 | 12/1960 | Waerner | 297/62 |
| 3,057,662 | 10/1962 | Johnson | 297/62 X |
| 3,916,462 | 11/1975 | Riches | 5/9 R |

Primary Examiner—Francis K. Zugel
Attorney, Agent, or Firm—Lawrence A. Nielsen

[57] ABSTRACT

A chair, suitable for aircraft or other transport, which is convertible into a berth, comprising in combination
(a) a seat base,
(b) a back rest, movably mounted on the rear portion of the base so as to be capable of being reclined from the erect, sitting position into a substantially horizontal, stretched berth position,
(c) a leg rest, mounted at the front portion of the base, and capable of being moved from an unobstructive position under the base into a substantially horizontal berth position, and
(d) a supporting means for retaining and locating the base berth in a sitting position and alternatively in a predetermined berth position;

wherein the supporting means is adapted and located so as to permit in use a second, chair to be stretched and moved into a berth position underneath said first chair, whenever the latter is in the elevated berth position with the rests in the stretched state; and in particular to such pair of chairs and rows thereof providing compartmental arrangements.

3 Claims, 10 Drawing Figures

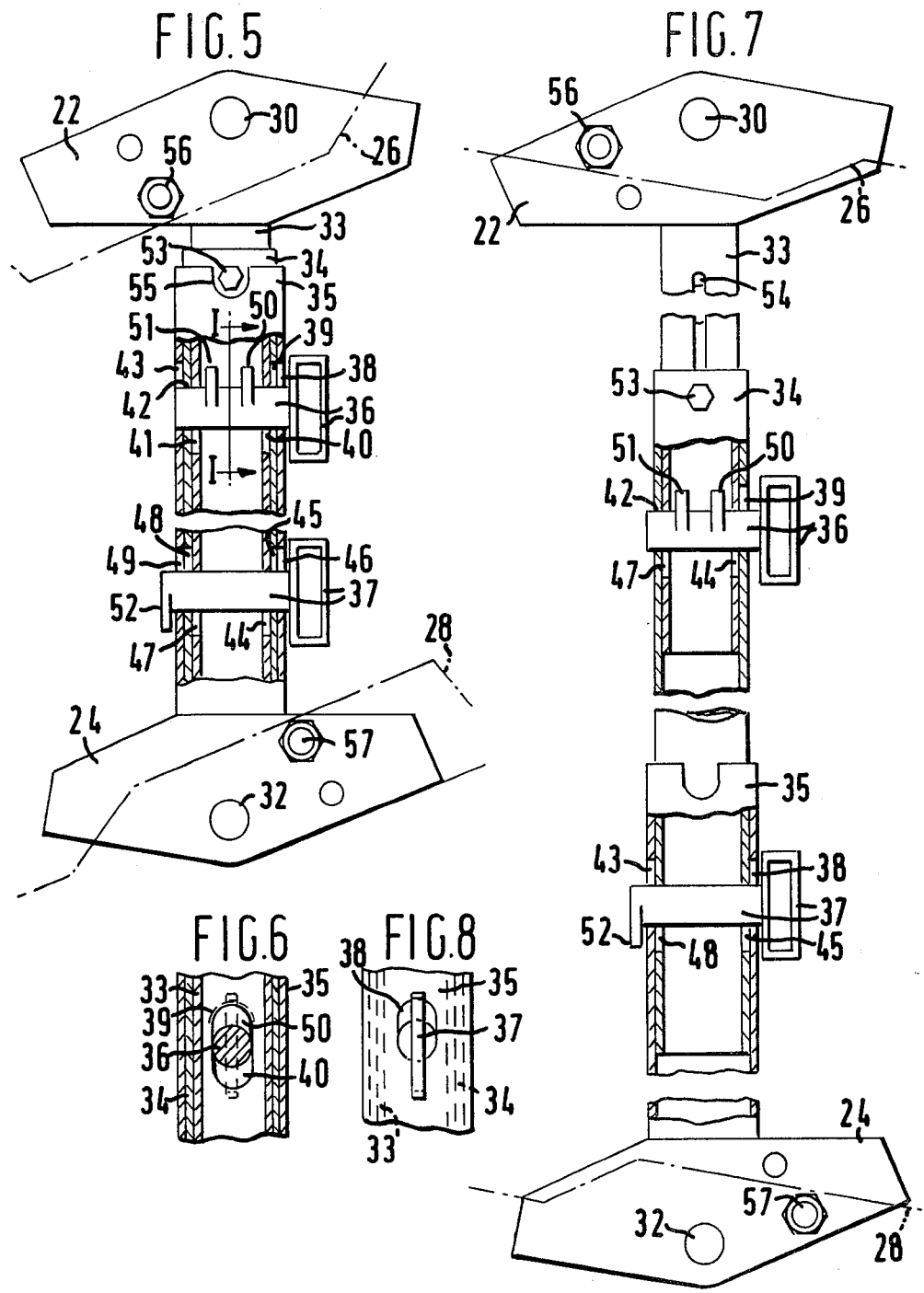

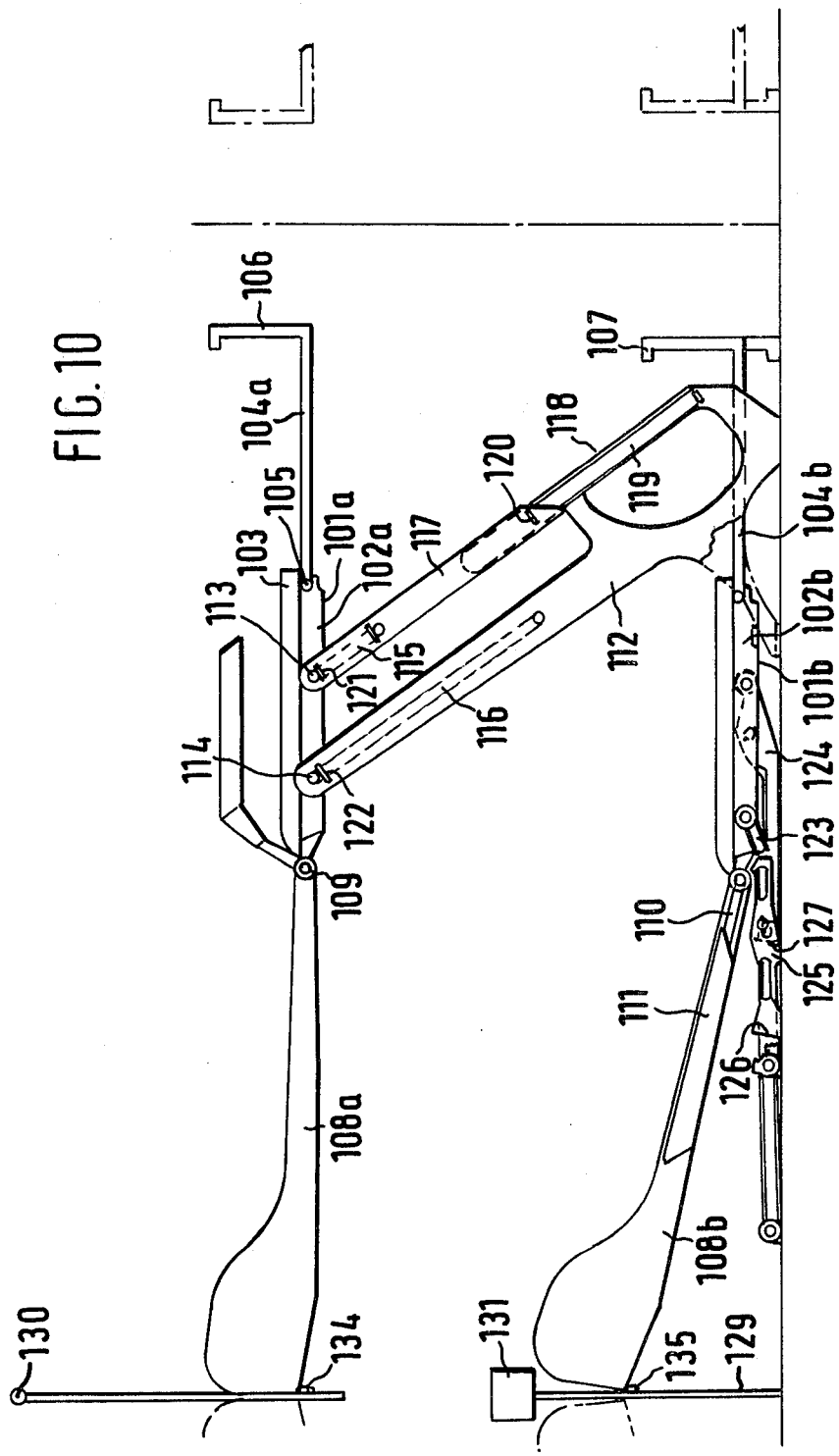

CONVERTIBLE SEATS FOR TRANSPORT

This is a continuation of application Ser. No. 102,236 filed Dec. 10, 1979.

This invention relates to convertible chairs and arrangements thereof, particularly suitable for aircraft and other transport.

More and more people travel great distances in aeroplanes, motor coaches and other vehicles. Although the comfort of passengers has been an important factor in the design for accommodation, the commercial requirement of carrying the maximum number of passengers usually led to tightly arranged seats within the available space. The back rest of the chairs provided for the purpose often has a limited capability for movement into a reclined position. Nevertheless such accommodation is very unsatisfactory and frustrating when the tired passenger tries to sleep, particularly during long journeys lasting for more than eight or even ten hours at a time.

The fatigue in consequence of such travel may seriously aggravate the biological consequences of crossing time zones. The health of the elderly and middle aged may be affected and the lack of sleep can easily reduce the mental alertness of those who travel to do work or carry out business at the destination of the journey. In spite of the suffering of great many people, no real answer to the problem has emerged during the recent decades of ever increasing mass travel.

It has now been found that a comfortable sleeping accommodation can be provided if the seat is convertible into a stretched berth which is capable of being elevated so as to allow another stretched unit to take its position underneath. A pair of such units for accommodating passengers can either be used as sequentially arranged chairs, or as parallel disposed berths, one being above the other within the same available space.

According to the present invention in one aspect therefore there is provided a chair suitable for aircraft or other transport, which is convertible into a berth, comprising in combination (a) a seat base, (b) a back rest, movably mounted on the rear portion of the base so as to be capable of being reclined from an erect, sitting position into a substantially horizontal, stretched berth position, (c) a leg rest, mounted at the front portion of the base, and capable of being moved from an unobstructive position under the base into a substantially horizontal berth position, and (d) a supporting means for retaining and locating the base both in a sitting position and alternatively in a predetermined berth position; wherein the supporting means is adapted and located so as to permit in use a second chair to be stretched and moved into a berth position underneath said first chair whenever the latter is in the elevated berth position with the rests in the stretched state.

The supporting means for the present invention may include suspending devices for instance of adjustable length which enable the seat bases to be held in a low and also in a high position. It is nevertheless more advantageous and preferred to support the seat base from below, i.e. from a floor or a foundation, in both positions.

In a preferred aspect the chair hereinbefore defined has supporting means which comprises an extensible device, mounting and locating one side of the base in the sitting position, or in the elevated position when extended, in combination either with another extensible device appropriately mounting and locating the other side of the base, or with means for attaching the other side of the base in the sitting and elevated positions to a wall or an upright structure of the aircraft or other transport; the arrangement being such that a section of the second chair can be lowered and slid in the stretched state between the said two extensible devices or between the first device and said wall or structure, whenever the base of the first chair is in the elevated position with stretched rests. Preferably two extensible devices are employed in a lateral disposition, supporting the said chair. The section of the second chair, which is received within the two supporting devices of the first one, may be its back or leg rest, or preferably its seat base.

Whilst the means for attaching the base to a wall or structure adjacent to the chair may carry part of the weight of the chair, it can also secure the same against lateral movements, particularly in the elevated position. It is therefore possible to use any suitable construction of supporting means, including that which comprises extensible means, in combination with attachment means to add rigidity and safety to the arrangement in any position. Depending on the weight carried, or the stresses involved, the attachment means may conveniently take the form of detachable clamps clutches and other joining and fastening devices known in themselves for the purpose.

Devices which can support the seat base and thereby the whole chair both in the sitting and the elevated berth positions in the manner described above, may include a leg, which is extensible for instance by its hinged components being unfolded from a tightly packed lower position into a stretched erect state. Alternatively the legs may be telescopically extensible, and comprise linkage members, slidably coupled one with another, and one or more locking means for firmly retaining the members relative to each other in the extended position. Such members are designed to carry weight and may conveniently be shaped to slide on or within each other. Cast or stamped alloys, strong welded plates or tubing may be employed for the purpose.

Alternatively and most preferably, the extensible supporting means may comprise laterally disposed structures which include slots or rails adapted to engage with correspondingly shaped components of the seat base so as to enable the same to slide along the slots or rails and thereby provide for the same a support which is extensible to a higher level from the floor than in the basic position.

The locking means for the sliding members may comprise known mechanisms, such as spring operated catch devices, keys sliding into alligned slots, etc. Similarly, the angular position of legs or other extensible sliding devices in relation to the seat base may, if necessary, be adjusted and fixed by appropriate arresting means, adjustable retention devices and the like.

The seat base of the chair may, as usual, comprise a basic framework made for instance of welded tubing and spring wiring, and carries a seat cushion. The upholstery may be provided by using an elastomeric foamy plastic enclosed in a cover fabric, or similar resilient composition. At the rear of the base is the back rest mounted in a manner so as to be capable of being moved into a stretched berth position. Advantageously, the mounting incorporates a reclining mechanism, which enables the back rest to be adjusted within the usual narrow limits in the sitting position, and to be lowered also into a substantially horizontal position, on conversion. The lower end of the back rest may for instance be movably connected to the framework of the seat base by hinges or a pivotal joint. For example the base can have a transverse tube or trunnions at its rear part of the purpose. Preferably, the reclining mechanism also includes a hydraulic jack with a return spring for easy adjustment. Conveniently a push button control is provided in the usual arm rests, which are normally also carried by the framework through struts.

The pivotal joint may advantageously be adapted to include means for retaining the back rest in a position of selected inclination. For instance, a cam and toothed wheel arrangement or friction discs can be incorporated for the purpose. A number of standard arrangements have been published and used for adjustable reclining seats, which can be appropriately modified to allow for an additional total turn into the horizontal position, whenever for instance an arresting mechanism, which is limiting the inclination to that usual in a sitting position, is released.

The arm rests may take the usual form of cantilevers carried by struts at the rear end of the framework of the base so as to remain horizontal irrespective of the inclination of the back rest. It is convenient to arrange for their mounting so as to be capable of being turned up and backwards towards the back rest, and received, if necessary, in an appropriate space between adjacent rests so as to become flush with their surface. The back rest for each chair may be conveniently shaped from a plastic or metal plate or frame, and is equipped with soft cushioning. At the upper end is a head rest, which is either integral with the back rest structure or is a continuation thereof for instance as a slidable or adjustable extension piece. Preferably, the head rest area is provided with lateral "blinkers" or forward pointing upholstered projections so as to ensure better privacy and partitioning between adjacent seats, particularly in the berth position.

Advantageously the upper extremity of the back rest can be equipped with means for attaching and fixing the same to a rigid screen, wall or upright structure, when the rest is in the elevated berth position. The berth can additionally be secured against longitudinal forces in this manner. Such means may take the form of detachable clamps, clutches and other joining and fastening means, preferably capable of fast manual release.

The leg rest is constructed for the purposes of the present invention so as to have an area which is suitable for holding the legs of the passenger when the rest is moved into the berth position, and becomes a continuation and extension of the surface provided by the back rest and the seat base. It could be shaped as a substantially rectangular surface from plastic or metal. Its upper edge is conveniently located along the front edge of the base, and may be mounted in manner which enables the same to be turned upward therefrom to complete the berth. For instance a pivotal joint with appropriate adjustment or retention mechanisms may be incorporated in the chair for the purpose. In the sitting position of the chair, the leg rest may be tucked underneath the seat base or is kept in a substantially vertical position.

Again, as with similar mechanisms suggested for back rests, ratchet wheel devices or friction disc may be adapted to serve for joining and adjusting the position of leg rests. Such known devices are to be applied in a manner which enables the leg rest to be turned upward and locked in a horizontal position. It may also be desirable that the same can be arrested in an intermediate, half-inclined position facilitating the descent of the user of the berth at the lower end of the same. Advantageously, retention of the leg rest is achieved at any inclination on the upward turn, and release for opposite movement is effected by a lift beyond the horizontal state. This may for instance be achieved by known ratchet mechanisms, which engage and release at the extreme positions.

The lower end of the leg rest may include an additional or integral member, perpendicular to its surface, which forms a vertical, terminating end guard, preventing the passenger from stretching himself beyond the length of the berth. In particular, such terminating end guard is to be constructed or shaped so as to enable the user to catch and lift up the end of the rest with his foot, thereby disengaging and lowering the same from the horizontal state, for instance when a mechanism suggested above is employed. A similar lift by foot could move the leg rest up again after the user has climbed into the berth.

It is standard practice to build bench type seats for aircraft and coaches, wherein more than one chair together forms a bench. In such cases a few seat bases are combined to form a common seat squab of single structure extending laterally, which carries the appropriate number of back and leg rests. Such arrangements are within the terms and scope of the present invention. Conveniently, the supporting means is also common, and therefore carries the entire length of the bench, preferably at both ends. It permits another bench, a second combination of chairs to be stretched and moved into a berth position underneath the elevated first bench. Preferably, the back and leg rests for each seat remain individually movable and separately adjustable to the required positions.

A second chair or bench, which is to be used in association with a chair or bench as hereinbefore defined, may be of similar structure for the sake of uniform appearance. This may also apply to the internal components of such chairs and their movable and adjustable relationship to each other. The requirement for stretching of the rests suggest identical or similar means in both instances, except for the supporting means which must in the second instance be suitable for permitting the seat base or squab to be moved from a sitting position to a lower berth position.

According to the invention in a particular aspect therefore there is provided a chair, as hereinbefore defined, in association with a second chair positioned in line with the same, wherein said second chair is convertible into a berth, and has a seat base and movable back and leg rests thereon, adapted to be stretched and moved into a substantially horizontal berth position underneath the same whenever that is in use in the elevated berth position. Although it is possible to arrange for a second chair to be in front of the chair which is to be moved into the elevated position, it is usually more convenient and space saving to have it positioned behind the same. In particular it is also preferred to arrange such pair so as to face the same direction.

In order to facilitate an easy approach to each berth at both levels, it is advantageous to allow space for a corridor for instance at the feet-end of the leg rests of the berths. It is furthermore most preferred to use two associated pairs of chairs, each pair facing the same direction and towards the other pair, in a mirror image arrangement wherein the corridor so formed is shared by all four chairs at their common feet end when converted into berths. If each of the chairs is laterally combined with two or three chairs side-by-side having a common seat squab, as hereinbefore described, the whole arrangement of 8 or 12 chairs can share a single corridor without any waste of space and form a compartment.

It is convenient and practical to terminate such a compartment at both ends with a vertical screen or wall of appropriate height to which each berth can be secured at its head-rest, as already described. Such screen adds rigidity and safety to the arrangement as a whole, and advantageously separates the berths from adjoining compartments thereby contributing to the privacy of the passenger. It is immediately apparent that rows of such compartments within an aircraft, coach or other transport consistently maintains the preferred head to head or feet to feet arrangement of passengers, notwithstanding the conversion from sitting to berth positions, and completely avoids the undesirable juxtaposition of heads with feet. At the lower regions, the separating screen may carry additional devices, e.g. supplying fresh air, and lighting facilities adjacent to the head rests of the lower berths, so that passengers have all necessary services available to them when lying on the berths at both levels.

The present invention provides comfortable sitting and resting accommodation without significant reduction of the passenger carrying capacity of the craft or vehicle. Any conversion from sitting into the lying position can be simply carried out by the users themselves or quickly arranged by trained cabin staff. A further advantage is that the convertible units according to the invention can easily be arranged in compartments so that the users could leave or approach their berths without disturbing or inconveniencing other passengers who may be asleep. The chairs can be easily fitted into existing aircraft or other vehicles or transport, or any other confined place where conversion of seats into a more resting accommodation is required.

For a better understanding of the invention and to show how the same may be carried into effect, reference will now be made, by way of example, to the accompanying drawings in which FIG. 1 is a side view of two successive rows of chairs;

FIG. 5 is an axial cross section of a telescopically extensible front leg in the collapsed position;

FIG. 6 is a partial rear view taken along the plane I—I of FIG. 5, with an upper locking key in position;

FIG. 7 is a partial axial cross section of a front leg in the extended position;

FIG. 8 is a partial front view of the portion of the leg which incorporates a lower locking key in position;

FIG. 10 is a side view of a row of chairs shown in FIG. 9, when converted into berths.

Figure 1:
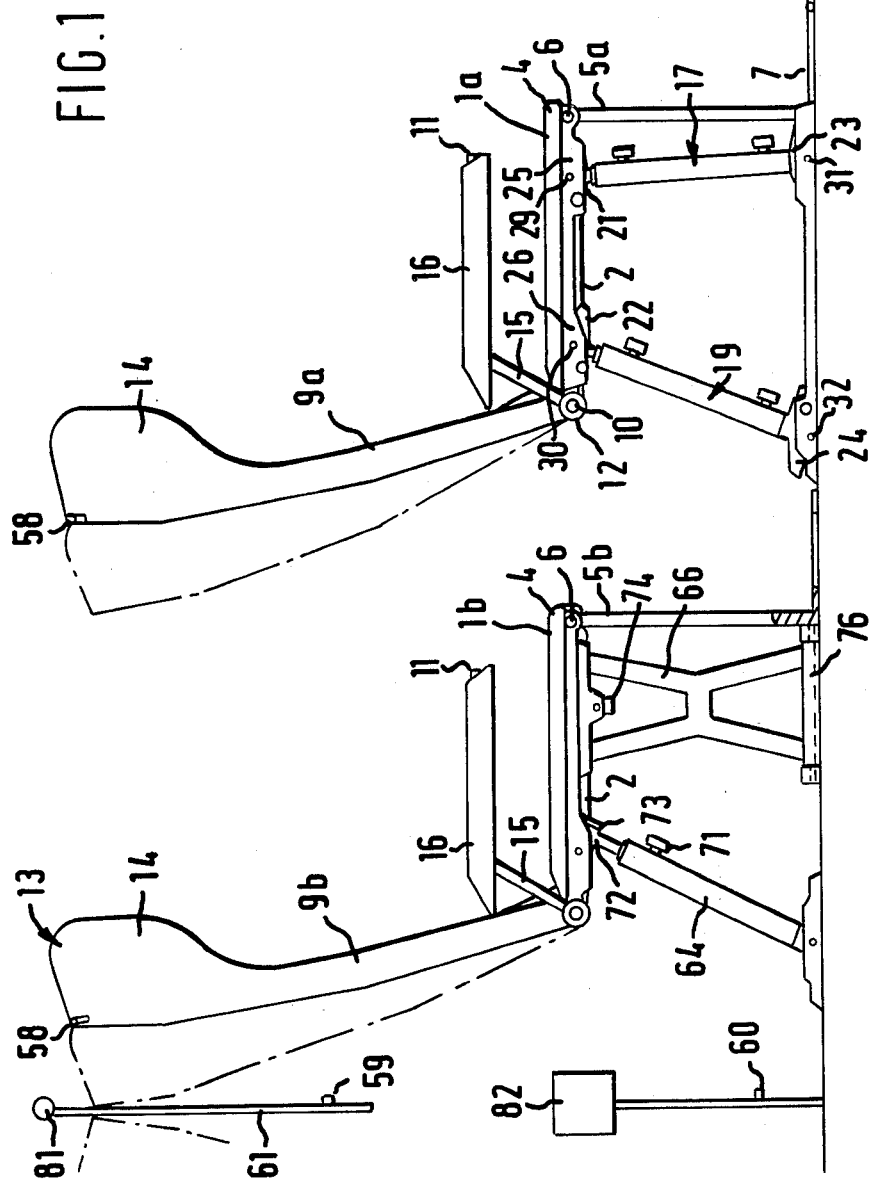

As shown in FIGS. 1 to 4, successive rows of chairs in an aircraft, herein referred to as the front and the rear row of chairs, each comprise horizontal seat squabs 1a and 1b respectively, which are provided and located within a surrounding basic framework 2 and a supporting tray 3 underneath, and include an elastic cushion 4, made of foam rubber or elastic plastics material enveloped inside a suitable fabric.

The front portions of frameworks 2 are conveniently of tubular shape and adapted to carry leg rests 5a and 5b formed from sheet material, e.g. plastics, equipped with a soft or elastic surface layer. A pivotal mounting 6 for the rests 5 conveniently incorporates a friction disc or preferably a ratchet and cam release mechanism, which enables the inclination of the rests 5 to be arrested and adjusted as required against the weight of the user's legs thereupon, but is releasable from the arrested state for instance by turning the rests upwardly beyond the horizontal position.

The extreme ends of leg rests 5 are provided with end guards 7 perpendicularly extending to the leg rests. The guards 7 have edge pieces 8, being pivotably mounted along the edge of the former so as to be able to pivot from a flush position shown in FIG. 1 on the floor into a position perpendicular to the guards 7 in FIG. 2.

The rear portions of basic frameworks 2 carry back rests 9a and 9b, which are turnably mounted at their lower ends on cylindrical shafts 10, of framework 2. The rests 9 are capable of being reclined within limits in the sitting position and can also be turned into the horizontal berth position.

This is provided by the use of known friction disc, ratchet and cam or other mechanisms (not shown), which are, as usual, controlled by a push button 11 for change of inclination or by a lock wheel 12 for complete reclination.

The upper region of the back rests 9 includes a head rest area 13, which is bilaterally equipped with blinkers or forward pointing projections 14. Conveniently the back and head rests are made from plastic or metal sheet materials which may form the supporting surface structures and a framework therefor, and from elastic materials for upholstery.

Shafts 10 also carry struts 15 which hold arm rests 16. Preferably, these are pivotally mounted so as to be capable of being turned upwards and backwards into a position in which the arm rests 16 fit into correspondingly shaped gaps along the side edge of back rests 9, so as to form an extended flush surface in the sitting or berth positions.

Seat squab 1a of the front row of chairs, and the supporting framework 2 and tray 3, rest upon and are carried by telescopically extensible front legs 17 and 18 and rear legs 19 and 20. Extension shoulders 21 and 22 are provided at the top end of the legs and similar extension shoes 23 and 24 at the bottom end, which are hinged within and received by corresponding support channels 25 to 28, attached to or integral with framework 2 or fixed to the floor structure, around pivots 29 to 32. The shoulders and shoes 21 to 24 are shaped with angular terminating surfaces so as to provide alternate horizontal supports which can lie along channels 25 to 28 in both positions shown in FIGS. 1 and 2 (or FIGS. 3 and 4, cf. also FIGS. 5 and 7), representing different inclinations for legs 17 to 20.

As shown in more detail on FIGS. 5 to 8, the rear legs 19 and 20, for instance, comprise upper, middle and lower link members 33 to 35, made of tubular material of increasing diameter, so that these members can be coaxially mounted within each other to provide a telescopically slidable system.

Locating keys 36 and 37 are received by appropriate apertures 38 to 43 and 44 to 49, near to the high and low end of members 33 to 35, in the collaped position of FIG. 5. The same keys 36 and 37 locate the members in the extended position of FIG. 7, wherein the key 36 passes through apertures 39, 44 47 and 42, and the key 37 through apertures 38, 45, 48 and 43, respectively (FIG. 7).

In order to prevent any accidental removal of the key 36, the main cylindrical body thereof is provided with oblong projections 50 and 51, near to the middle section, and the key 37 with a similar projection 52 at its outer end. These projections prevent the keys from sliding out from the positions shown, and only enable the same to be removed when the upper link member 33 is lifted upwardly so as to align the oblong shaped apertures (FIGS. 7 and 8).

The middle link member 34 is prevented from turning relative the upper member 33 by a positioning screw 53, which slides within slot 54 along the wall of the member 33. The head of the screw 53 is received in an appropriate "U" shaped recess 55 in the lower link member 35 when the leg is in the collapsed position.

The extension shoulders and shoes of the legs are rigidly attached or integral with the upper and lower members 33 and 35 of the legs and turn into alternative positions around the pivots 30 and 32. In order to hold the shoulders and shoes, and thereby the collapsed or extended legs in the positions with the required inclination, screw threaded locating bolts 56 and 57 are used. These bolts pass through alternative holes on the walls of channels 25 and 26, and are received by corresponding screw threaded bores in the shoulders and shoes.

Figure 2:
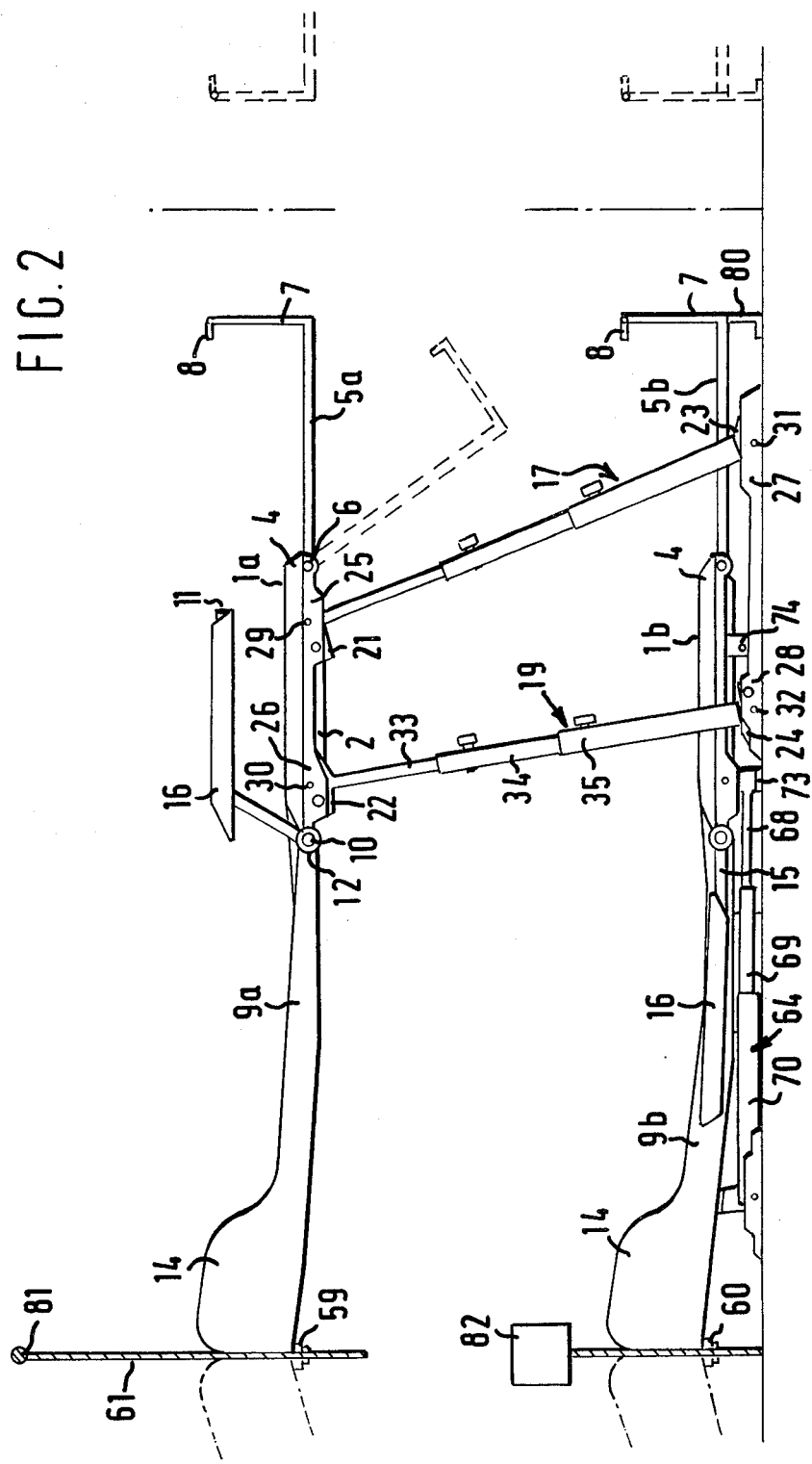
FIG. 2 is a side view of the rows of chairs shown in FIG. 1 when converted into berths.
Figure 3:
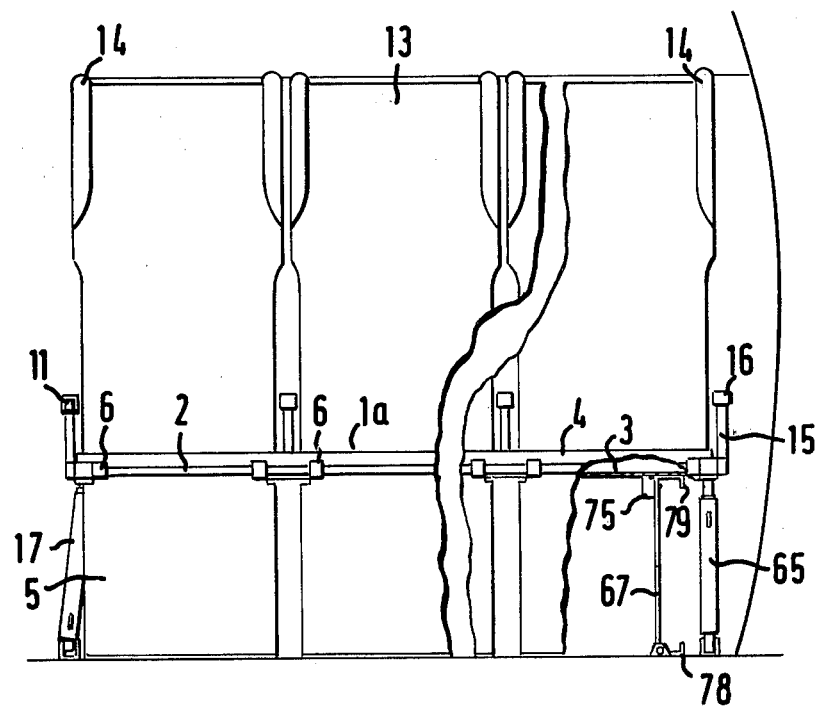
FIG. 3 is a frontal view of the row of chairs shown on FIG. 1.
Figure 4:
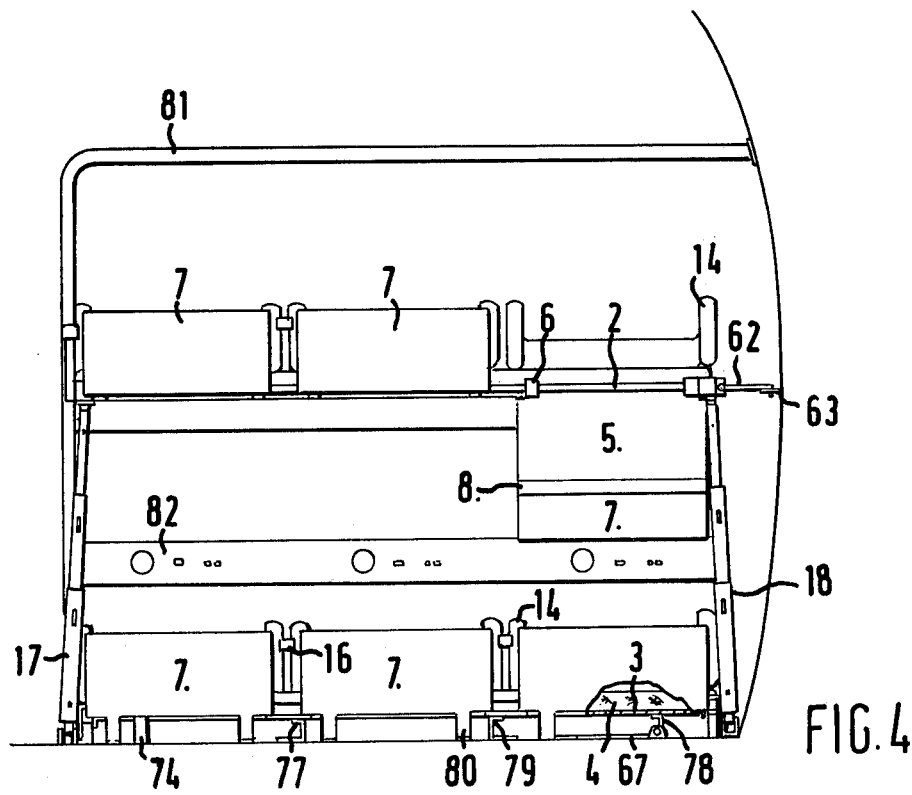
FIG. 4 is a frontal and partially exposed view of the rows of chairs in the berth positions.

In order to secure the chairs more firmly to the surrounding structures, in particular when the same are converted into a berth in an elevated position shown in FIGS. 2 and 4, each back rest 9 is equipped at the rear side of the upper edge of the head rest 11 with a hinged hook 58 which can engage in a corresponding rectangular catch 59 or 60 mounted on the higher or lower region of a partitioning screen 61 or of other adjacent structure. Similarly a second hinged hook 62 is attached to the framework at the lateral end of the seat squab, which is engagable by a second catch 63 screwed to the adjoining wall of the vehicle or aircraft, or to other adjacent structures.

Seat squab 1b of the rear row of chairs and its supporting framework carry a set of back and leg rests similar to those of the front row. The row rests at both ends upon rear legs 64 and 65 and supporting structures 66 and 64. For instance the leg 64 at one end is extensible and incorporates telescopically linked slidable linkage members 68 to 70, and a locking key 71, and is of similar construction as legs 17 and 19, except that it is adapted to be laid horizontally when extended. For this purpose, its upper shoulder member 72 is extra-axially pivoted and is provided with a specially shaped extension sole-piece 73 which can act as a support for the squab when touching the floor in the extended position.

Supporting structures 66 and 67 are hinged at both ends of their lower edges to the floor and are fastened at the centre of their cross linkage element at the top part by a screw-threaded bolt to blocks 74 and 75 which are attached to the lower surface of the tray 3. When disengaged from the blocks 74 and 75 the structures 66 and 67 can be turned downwardly and laid flat on the floor whilst rectangular bracket projections 76 to 79 act as supports to the underside of the lower back rest 9b, as shown on FIG. 4. In addition, the blocks 74 and 75 serve themselves as supports for the seat squab 1b, when lowered to the berth position. The rear sides of leg rests 5b are equipped with a perpendicular backward pointing leg extensions 80 so as to aid their support when turned into the horizontal position.

The partitioning screen 61 is mounted within a tubular frame 81 of sufficient rigidity and strength. It incorporates a gap within its central area, and a service console block 82 for lighting, communications, fresh air or other facilities necessary for the passengers resting on the berths provided at the lower level.

The two rows of chairs herein described are supplemented by two other rows symmetrically facing them in a mirror image arrangement thereby providing a compartment of seats within two partitioning screens. The distance between the two pairs of rows is so adjusted that the terminating guards of the leg rests are separated from each other at the same level by a reasonably sized gap or corridor, when the leg rests are fully horizontal. This corridor can be between 25 to 40 cm (10 to 16 inches), which enables users to approach the inner chairs with comparative ease.

The separating screens can be shared by adjacent compartments, and the available passenger carrying area of the vehicle or aircraft being thereby divided into rows of such compartment units. Such arrangement consistently avoids head to foot adjacency, in any circumstances.

In order to convert the chairs into berths, locating bolts 56 and 57, and corresponding bolts in the other three legs of the front row of chairs are removed. The back rest 9a is released by turning lock wheel 12 and is reclined as far as possible. The lock keys 36 and 37, and other similar keys are removed after turning the lower keys around and lifting the seat squab 1a slightly upward. The seat squab 1a is then lifted into the maximum position and moved slightly backward so as to enable link members of the legs to slide into the expanded position. The keys 36 and 37 and the keys to the other legs are pushed into locating positions, as shown in FIG. 7, and the lower keys turned around. The locating bolts 56 and 57 are then moved into the alternative fixing locations for the extension shoulder 22 and shoe 24 and the other legs are identically fixed for berth position.

The back row of chairs is now disengaged from the fixed sitting position by removing the locating bolts from the legs 64 and 65, and the bolts which fasten the supporting structures 66 and 67 to blocks 74 and 75. The back rest 9b is fully released by turning its lock wheel 12 and the leg rests 5b are somewhat lifted for gentle descent. The locking key 71 is removed, the supporting structures 66 and 67 are turned downwards around their hinges, and the lateral arm rests 16 are turned upwards. The seat squab 1b is allowed to move forward and downward whilst the linkage members 68 to 70 of the rear legs slide into the extended position. The extended berth comes to rest on the rectangular bracket projections 76 to 79, on blocks 74 and 75 and leg extensions 80 when fully stretched at floor level.

The back rests 9a and leg rests 5a of the upper row of berths are fully adjusted into the horizontal position and hinged hooks 58 are engaged in catches 59 on the screen 61. The hook 62 is attached to the catch 63 at the inner side of the row. Similarly, the hooks 58 on the back rests 9b are engaged in catches 60 at the lower level. Arm rests 16 which are between adjacent berths are turned into reclined position, level with the berths, if desired. Leg rests 5a may also be moved into intermediate inclined positions so as to facilitate easy approach by users.

Figure 9:
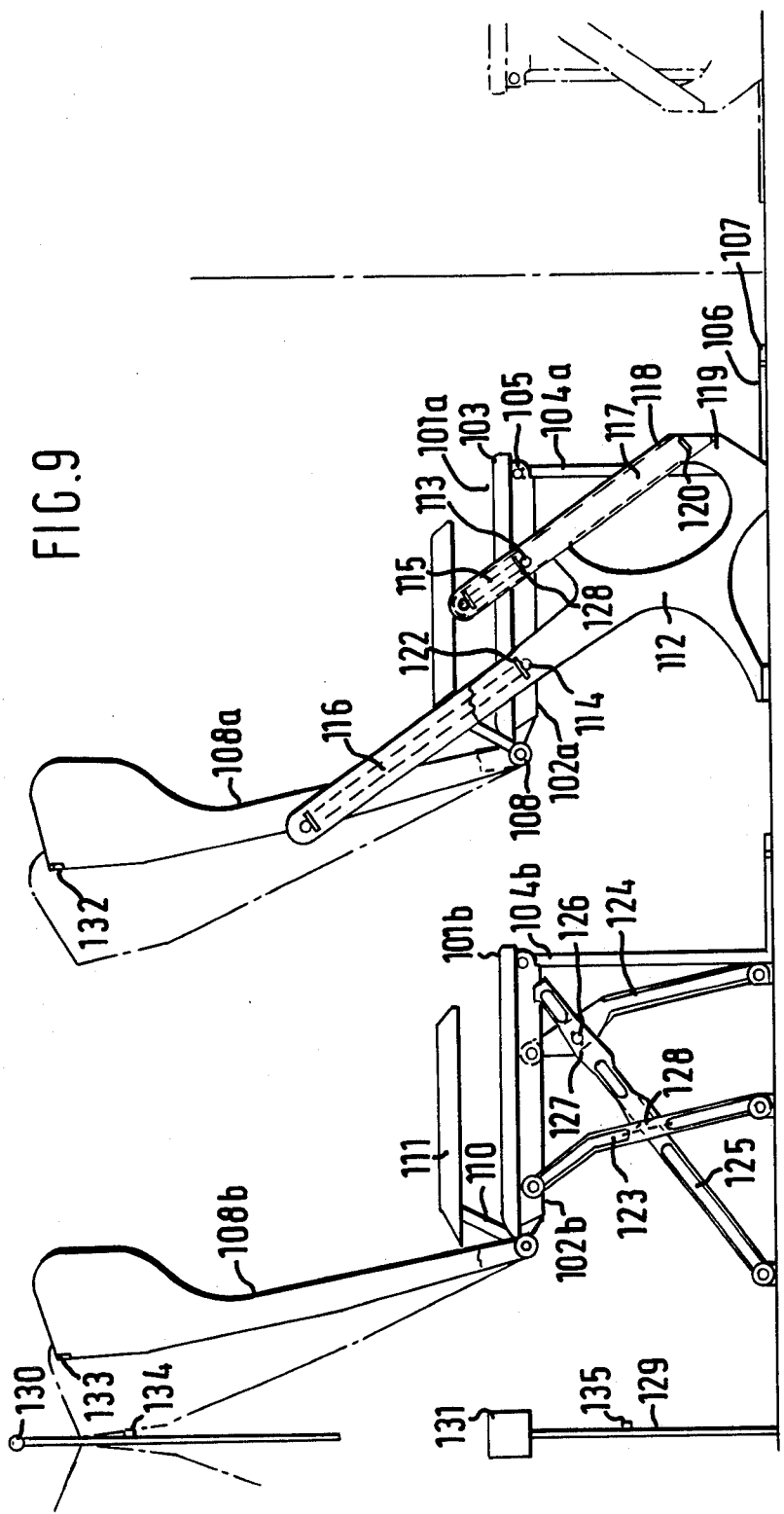
FIG. 9 is a side view of an alternative support system for a front and back row of chairs.

Another type of support system according to the present invention is shown in FIGS. 9 and 10, in two alternative forms. The system includes a laterally disposed basic support 83 below seat level. Integral with such support is an upward stretching straight arm 84, with its upper end adjacent to the edge of the back rest of the chair (shown by short chain lines). Within the inside of the arm 84 there is a longitudinal channel 85 within which an appropriately shaped sliding projection (not shown) of the framework of the seat base of the chair can move from a low to a high position. The movement of the projection in either of the extreme positions is restrained by appropriate locking means to be inserted into cross slots 86 and 87.

A second parallel arm 88 is also integral with or attached to the basic support 83 which carries a slidable extension unit 89. When moved into a higher position along the arm 88, the unit 89 provides a second support for the seat base at the berth level, in addition to the fixed arm 84.

The unit 89 is also equipped with a second longitudinal channel 90 at the inside of its upper end, which is capable of receiving a slidable second projection (not shown) from the framework of the seat base of the chair. Again a pair of cross slots 91 and 92 allow for means, such as locking devices to be inserted in both the sitting and the berth positions, and an additional locking key 93 secures unit 89 on the arm 88.

As shown in FIGS. 9 and 10 an alternative arrangement of successive rows of chairs comprise horizontal seat squabs 101a and 101b, respectively which are provided and located within a surrounding basic frameworks 102a and 102b and include an elastic cushion 103.

The front portions of frameworks 102 are adapted to carry leg rests 104a and 104b. A pivotal mounting 105 for the rests 104a conveniently incorporates a release and adjustment mechanism, which enables the individual rests to be arrested in an inclined or horizontal position as required in the berth position.

The extreme ends of leg rests 104 are provided with end guards 106, perpendicularly extending from the leg rests. The guards 106 have edge pieces 107, being pivotally mounted along the edge of the former.

The rear portions of basic frameworks 102 carry back rests 108a and 108b, which are turnably mounted at their lower ends on cylindrical shafts 109. The back rests 108 are capable of being reclined within limits in the sitting position and can also be turned into a horizontal berth position.

Shafts 109 also carry struts 110 which hold arm rests 111. These may be pivotally mounted so as to be capable of being turned upwards and backwards into a position along the side edge of back rests, so as to form an extended flush surface in the sitting or berth positions.

The basic framework 102a is slidably mounted in a supporting system 112 by trunnions 113 and 114. The system 112 also comprises an elongated member 117 which can extend the support system by sliding upwardly along rails 118 on front part 119 and carries slot 115, which together with slots 116 at the rear of the chair house the trunnions 113 and 114. The sliding member 117 is located by a key 120 engaging with part 119 in a lower or a higher position thereon. The trunnions 113 and 114 are, located by corresponding seat keys 121 and 122 which engage across slots 115 and 116 at positions which correspond to the lower sitting and the higher berth position for the front row of chairs.

The back row of chairs is conveniently supported from underneath by a pivotally hinged system, which enables the same to be tilted forward and lowered into the berth position underneath the front row of chairs. Legs 123 and 124 are turnably mounted on the floor and at the seat base 102b, and are locked by an appropriately shaped linkage member 125 whenever the rear chairs are in the sitting position. The linkage member is fixed to the leg 124 by means of releasable lock 126 and hooks into an appropriate shaped middle section which abuts against corresponding shoulder enlargements 127 and 128 on the legs.

A partitioning screen 129 is mounted within a tubular frame 130 of sufficient rigidity and strength. It incorporates a gap within its central area, and carries a service console block 131.

The two rows of chairs herein described are supplemented by two other rows symmetrically facing them in a mirror image arrangement thereby providing a compartment of seats within two partitioning screens. The distance between the two pairs of rows is so adjusted that the terminating guards of the leg rests are separated from each other by a reasonably sized gap or corridor, when the leg rests are fully horizontal.

In use, the front row of chairs is converted into berths by removing keys 120, 121, and 121 and by lifting the basic framework 102a upward whilst rests 104a and 108a are allowed to move into the horizontal position. Trunnions 113 and 114 slide within slots 115 and 116 and carry the sliding member 117 along rails 118 until the highest position is reached. Keys 121 and 122 are reinserted to lock the trunnions 113 and 114, and key 120 to reengage member 117 with part 119.

The back row of chairs is then lowered into a berth position by disengaging lock 126, and turning linkage member 125 towards the floor. This enables seat base 102b to be pushed forward on pivotally mounted legs 124 and 125 whilst leg rests 104b is turned upward. The back rest 108b is also released so as to incline backwards to meet the screen 129, when the seat base 102b comes to rest at floor level. In order to provide additional support and rigidity to the arrangement in the berth position, hooks 132 and 133 may be used to engage in catches 134 and 135 on the screen 129. The edge pieces 107 are turned inward on end guards 106 on the leg rests and the berths are ready for use.

I claim:

1. A convertible seat unit comprising a first chair in combination with a second chair positioned in line with same wherein said first chair comprises in combination
    (a) a first seat base having projections from the framework thereof,
    (b) a first back rest movably mounted on the rear portion of said first seat base so as to be capable of being reclined from an erect, sitting position into a substantially horizontal, stretched berth position,
    (c) a first leg rest, mounted at the front portion of said first seat base, and capable of being moved from an unobstructive position under said first seat base into a substantially horizontal berth position, and
    (d) a first supporting means of retaining and locating said first seat base both in a sitting position and alternatively in an elevated berth position which comprises a base support member having parallel, upward stretching arms containing longitudinal channels which said projections engage in a slideable manner, and wherein said second chair comprises (e) a second seat base, (f) a second back rest movably mounted on the rear portion of said second seat base so as to be capable of being reclined from an erect, sitting position into a substantially horizontal, stretched berth position, (g) a second leg rest, mounted at the front portion of said second seat base, and capable of being moved from an unobstructive position under said second seat base into a substantially horizontal berth position, and (h) a second supporting means of retaining and locating said second seat base in a sitting position and alternatively in a horizontal berth position directly underneath said first chair when said first chair is in the elevated berth position, said supporting means comprising substantially parallel legs turnably mounted at one end on the floor and at the other end on said second seat base and a locking member turnably mounted at one end on the floor and capable of lockably engaging one of said legs and said second seat base.

2. A convertible seat unit according to claim 1, wherein said leg rests are turnably mounted along the front edges of said seat bases.

3. A convertible seat unit according to claim 1, comprising pivotal joints with adjustment and retention mechanisms for said leg rests so that the same can be turned from a vertical position to a substantially horizontal position and retained therein.

* * * * *